United States Patent

Rohs et al.

[11] Patent Number: 6,110,046
[45] Date of Patent: Aug. 29, 2000

[54] MECHANICAL TORSIONAL VIBRATION DAMPER

[75] Inventors: Ulrich Rohs; Hans Rohs, both of Düren; Dietmar Heidingsfeld, Aachen, all of Germany

[73] Assignee: Rohs-Voigt Patentverwertungsgesellschaft mbH, Düren, Germany

[21] Appl. No.: 09/033,735

[22] Filed: Mar. 3, 1998

[30] Foreign Application Priority Data

Mar. 3, 1997 [DE] Germany .............................. 197 08 328

[51] Int. Cl.⁷ ........................................................ F16D 3/66
[52] U.S. Cl. ................................................................ 464/66
[58] Field of Search ........................ 464/66; 192/213.31, 192/214.1, 213.22, 213.12, 213.1

[56] References Cited

U.S. PATENT DOCUMENTS

| | | | |
|---|---|---|---|
| 4,537,296 | 8/1985 | Lech, Jr. et al. ................ | 192/213.31 |
| 4,679,679 | 7/1987 | Lech, Jr. et al. ................ | 192/213.31 |
| 5,496,216 | 3/1996 | Roehrle . | |
| 5,503,595 | 4/1996 | Rohrle ............................... | 464/66 |
| 5,863,253 | 1/1999 | Rohs et al. ....................... | 464/66 |

FOREIGN PATENT DOCUMENTS

| | | |
|---|---|---|
| 2 687 749 | 8/1993 | France . |
| 2 690 959 | 11/1993 | France . |
| 34 29 705 | 7/1985 | Germany . |
| 41 28 868 A1 | 3/1993 | Germany . |
| 43 41 547 | 6/1994 | Germany . |
| 2 093 565 | 9/1982 | United Kingdom . |
| 2 269 883 | 2/1994 | United Kingdom . |
| 2 273335 | 6/1994 | United Kingdom . |

OTHER PUBLICATIONS

Derwent Abstract for Patent DE 3,429,705. Jan. 1985.

*Primary Examiner*—Lynne H. Browne
*Assistant Examiner*—Greg Binda
*Attorney, Agent, or Firm*—Henry M. Feiereisen

[57] ABSTRACT

A mechanical torsional vibration damper includes a primary part and a secondary part which are connected to one another by a spring and damping system of tangential compression springs and thrust plungers acting on contact surfaces on the primary part and the secondary part, with an additional damping unit being provided between the primary part and the secondary part.

13 Claims, 10 Drawing Sheets

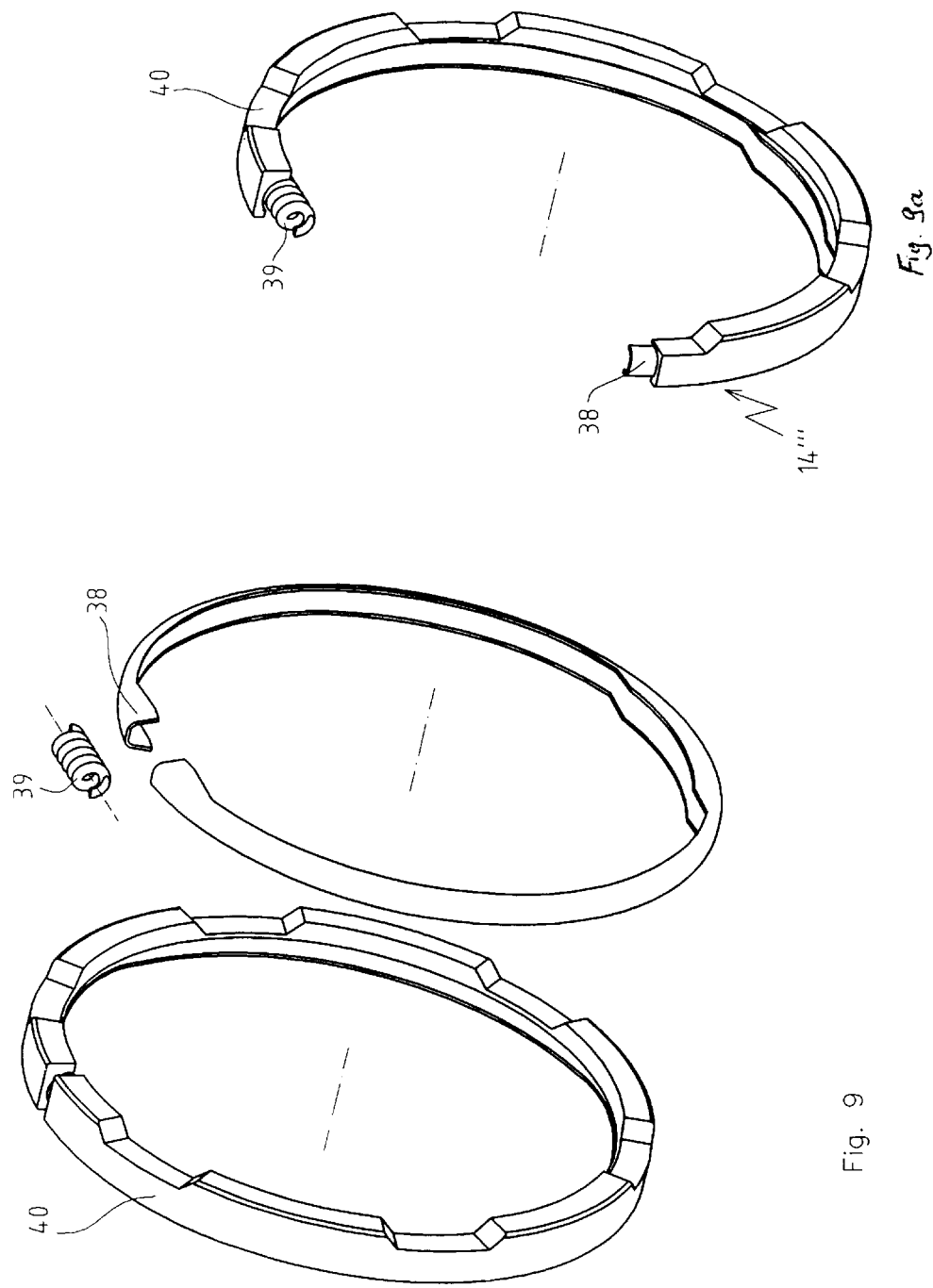

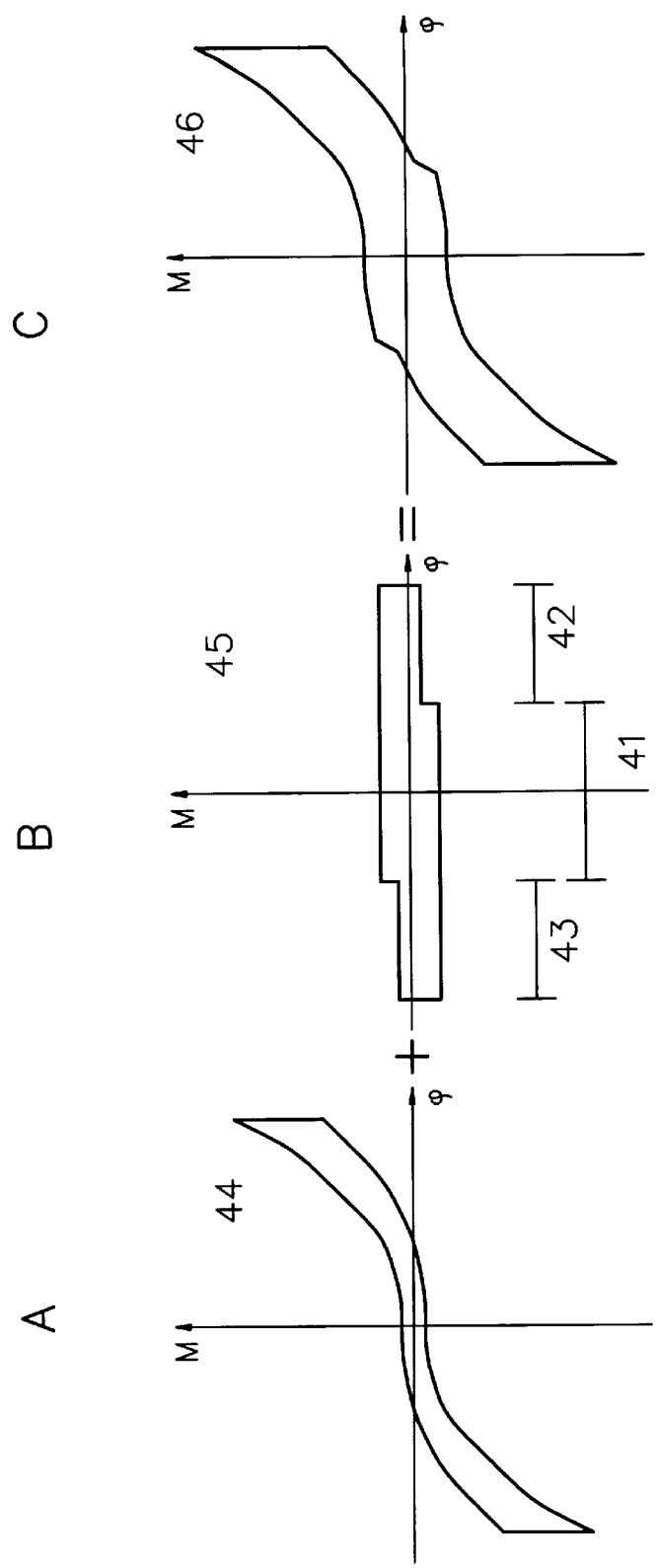

MECHANICAL TORSIONAL VIBRATION DAMPER

BACKGROUND OF THE INVENTION

The present invention relates to a mechanical torsional vibration damper.

A problem in automotive engine manufacture is that the torsional vibrations caused by the engine firing order are transmitted from the engine into the drive train, especially when the frequencies come close to the natural frequencies of the system. This is particularly unpleasant at idle speed but also during load reversal situations.

In order to avoid this, various designs of so-called mechanical torsional vibration dampers are known which have elastic damping media in the form of springs or hydraulic components arranged between a primary part connected with the engine crankshaft and a secondary part connected with the clutch.

However, known systems have the disadvantage that they cover only a part of the working spectrum of the drive, but are ineffective in the remaining load range. The problem is that the load range requires a spring force and damping corresponding to the transmitted torque and the speed while at idle speed only minor spring forces and practically no damping is desirable in order to attain declutching at idle. In the critical speed range, i.e. at speeds in the region of the natural frequency, very high damping is required since the circular accelerations would be clearly exceeded compared with the primary side. This speed range is passed especially when starting the engine but also during load reversal situations. At resonance dynamic moments can occur which amount to a multiple of the rated moment.

In this context, reference is also made to commonly assigned copending patent application Ser. No. 08/755,175, now patented entitled Torsional Vibration Damping Assembly, and filed on Nov. 25, 1996, the disclosure of which is incorporated herein by reference. This copending patent application discloses a mechanical torsional vibration damper with a primary and a secondary part which are connected by a positive/non-positive spring and damping system made of tangential compression springs and thrust plungers acting on contact surfaces on the primary and secondary part. This coupling includes a rotating drive disk and a coaxially arranged driven disk rotating in the same direction with means for elastic power transmission wherein the drive disk partly overlaps the driven disk and has radial pockets distributed over the inside circumference of the overlapping part and having a surface area slightly tapering towards its circumferential ends in direction of the drive disk. The surface area of the driven disk has a polygonal cross section, and pairs of wedge-shaped thrust plungers are arranged in the pockets which are kept apart from each other by at least one compression spring. At their sides facing the surface area of the driven disk, the thrust plungers are level or slightly arched, and compression springs are arranged in the drive disk or on the thrust plungers which act on the driven disk and which at idle speed merely exert a resetting moment from the drive to the driven disk but practically no friction force.

SUMMARY OF THE INVENTION

It is thus an object of the present invention to provide an improved mechanical torsional vibration damper, obviating the afore-stated drawbacks.

In particular, it is an object of the present invention to provide an improved mechanical torsional vibration damper which provides suitable damping across the entire load range in order to avoid a contact of opposing thrust plungers under high circumferential force and to suitably match damping to the circumferential force between primary and secondary parts.

These objects, and others which will become apparent hereinafter, are attained in accordance with the invention by a mechanical torsional vibration of a spring and a damping system including tangential compression springs and thrust plungers acting on contact surfaces on the primary and secondary parts and having an additional damping unit provided between the primary part and the secondary part.

Under normal load conditions, only the spring and damping system in the form of tangential compression springs and thrust plungers, as described in copending U.S. patent application Ser. No. 08/755,175, now patented acts between the primary and secondary parts. However, if greater torques and consequently greater angles of rotation are encountered between the primary and secondary parts in the system which need to be compensated, i.e. if a predetermined relative angle of rotation (free clearance) between the primary and secondary parts is exceeded, the imparted energy is converted into heat by friction through the additional damping unit and removed from the system so that excessive values compared with the primary side are prevented.

Preferably, the damping unit has a drag ring, preferably without clearance, inserted in a slot of the primary or the secondary part which on the side opposite the slot is provided with drive cams which engage with free clearance in cavities provided on the secondary or the primary part.

In radial direction, the friction work is performed on the outer and inner surfaces of the drag friction ring and the sides of the slot in contact with it. This embodiment is particularly compact and economical and can be easily integrated into existing mechanical torsional vibration dampers.

It is advantageous if the drag friction ring, similar to a shaft oil seal, has an open hollow section for receiving a coiled metallic spring, a rubber ring or similar device. Suitably, a O ring is used as rubber ring. The coiled metallic spring, the rubber O-ring or similar device act a means of preloading the drag friction ring in radial direction. With this design, it is possible to adapt the surface pressure of the drag friction ring to the slot walls and thus the damping characteristic of the drag friction ring by varying the included elements to suit a special application (type, output and rated torque of engine). However, it is also possible to transmit an axial force to the primary or the secondary part with the rubber O-ring.

The embodiments of drag friction rings described above have an angle-independent friction. However, in certain applications, it may be practical to provide the drag friction ring and the slot received in the drag friction ring with uneven width in circumferential direction.

In accordance with a preferred embodiment of the present invention, the drag friction ring has at least two interconnecting parts having incorporated therebetween a grease charge. Through this configuration, Coulomb friction is replaced by a speed-proportional shearing friction in the grease charge which is practical for certain applications.

Advantageously, the damping unit has a tension ring which is interrupted in circumferential direction.

In order to achieve a defined predetermined friction increase when turning the primary part relative to the drag ring, it is suggested to design the drive cams of the drag friction ring and the cavities of the primary part and/or the contact surfaces of the drag friction ring and the secondary part with load surfaces, ramp or curved surfaces. In this way it is possible to create an accurately defined friction which is independent of the circumferential force since the two surface pairs acting on each other are pressed together in axial direction with increasing relative angle of rotation to thereby create an angle-dependent friction.

According to a further advantageous feature of the present invention, the slot accommodating the drag friction ring exhibits a conical configuration in axial direction. Such a conical design in conjunction with the mentioned ramp especially results in particularly favorable damping results in practice.

Preferably, the drag ring is made of plastic material to meet the demanded requirements.

BRIEF DESCRIPTION OF THE DRAWING

The above and other objects, features and advantages of the present invention will now be described in more detail with reference to the accompanying drawing in which:

FIG. 9 is a schematic illustration, in exploded view, of a drag friction ring in the form of a tension ring interrupted in circumferential direction;

FIG. 9a is a schematic illustration of the drag friction ring in assembled state; and FIG. 10 is a schematic graphical representation, as superimposition of characteristics, of the operation of a torsional vibration damper according to the present invention with drag friction ring.

DETAILED DESCRIPTION OF PREFERRED EMBODIMENTS

Figure 1:
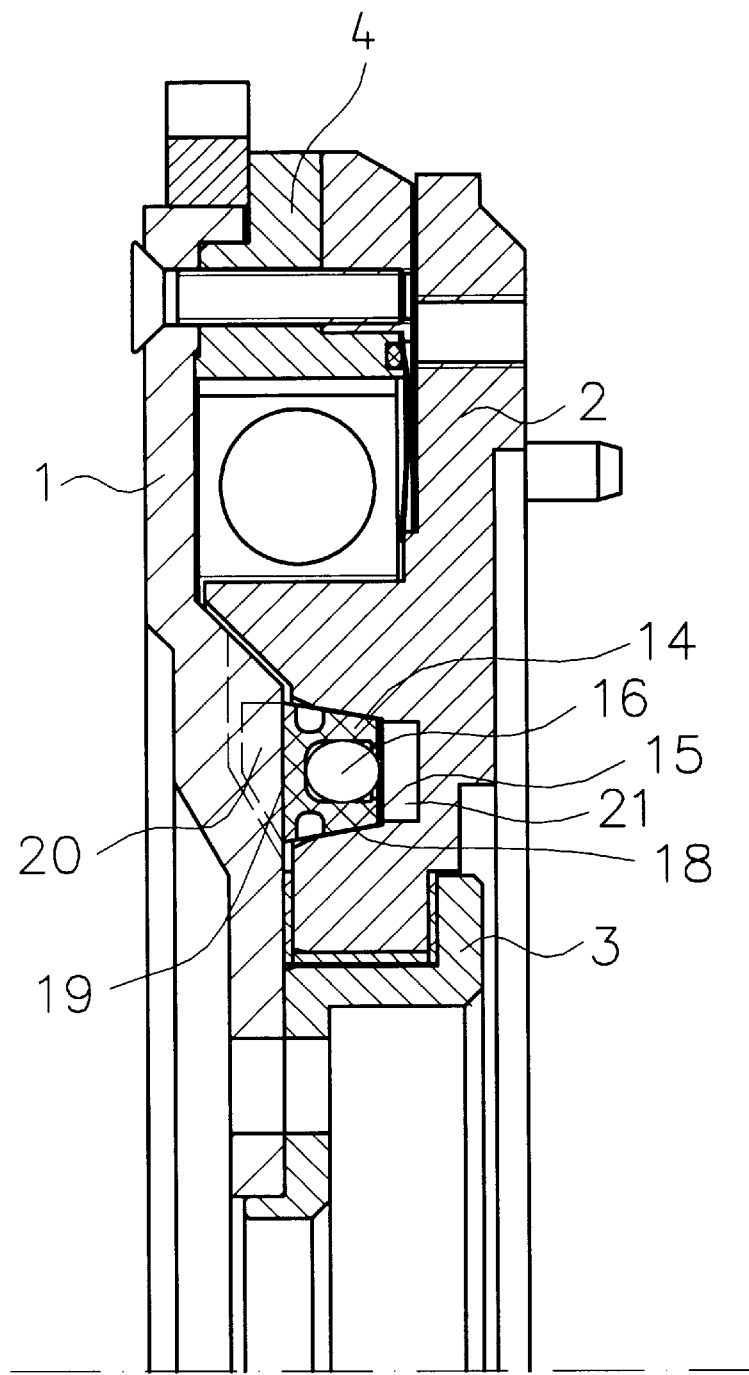
FIG. 1 is a fragmentary axial sectional view of one embodiment of a torsional vibration damper according to the present invention, showing in detail a first variation of a drag friction ring according to the present invention provided with coiled metal spring.

Turning now to the drawing, and in particular to FIG. 1, there is shown a fragmentary axial sectional view of one embodiment of a torsional vibration damper according to the present invention, including a primary part 1, shown here as drive disk, and a driven disk or secondary part 2 arranged coaxially to the primary part 1. A drive train, not shown, with additional coupling elements of a clutch or similar device engages at the back of the driven disk 2.

The driven disk 2 sits on a centering hub 3 which has an axial Z-shaped configuration and is connected with the drive disk 1.

Figure 2:
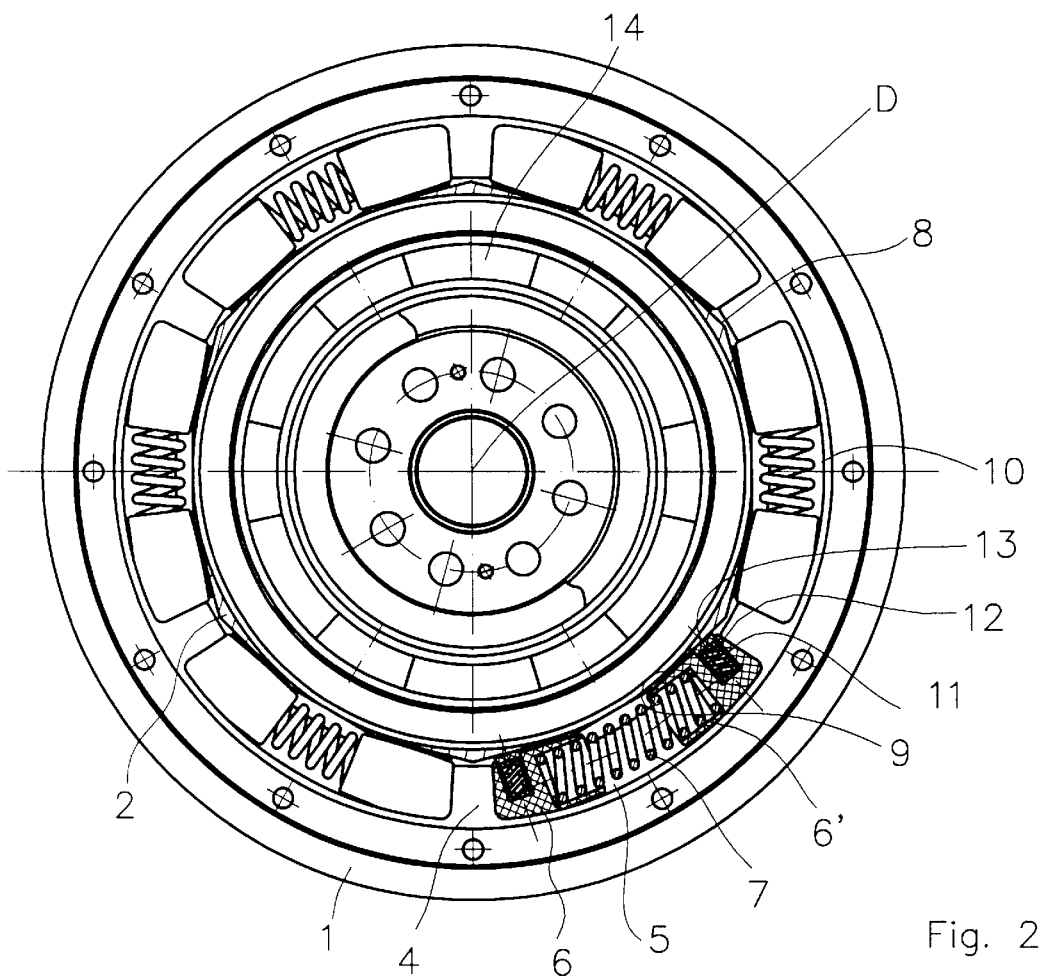
FIG. 2 is a cross section through the torsional vibration damper of FIG. 1.

As shown in FIG. 2, the drive disk 1 has an annular part 4 which overlaps a front part of the driven disk 2 and is provided on its inside with radial pockets 5 spaced about the circumference and tapering in direction of both ends. A pair of thrust plungers 6 is arranged in each pocket 5 which are forced apart by at least one compression spring 7. At idle speed, the thrust plungers 6 rest against the ends of the pocket 5.

The driven disk 2 exhibits an outer surface area 8 of polygonal cross section which is complemented by the side 9 of the thrust plungers 6 facing the driven disk 2 and being level or slightly arched.

Each pocket 5 has an outer surface area 10 which forms a partial cylinder which has an axis of curvature substantially corresponding to the axis of rotation of the clutch, or situated on the radial middle plane through the pocket 5 between the pocket 5 and the axis of rotation of the clutch. The radial middle plane contains the axis of rotation D and a radial beam extending perpendicular to the axis of rotation D and intersecting the pocket.

The thrust plungers 6 are formed with radial bores 11 for receiving small compression springs 12 which press via transmission balls 13 on the outer surface area 8 of the driven disk 2. Thus, a resetting moment is applied from the drive disk 1 to the driven disk 2 during idling but essentially no friction force.

If the drive disk 1 is rotated and a torque is transmitted to the drive train, the drive disk 1 moves relative to the driven disk 2 and urges each time one of the two thrust plungers 6 contained in a pocket 5 against the other thrust plunger 6' to thereby apply a friction force on the drive disk 1, resulting in a damping of torsional vibrations.

However, when the torque generated between the drive disk 1 and the driven disk 2 becomes too great, e.g. when passing through the critical speed at the moment of starting, this type of damping system by itself would be insufficient and the thrust plungers 6 would approach one another too closely or even make contact, resulting in annoying noise and progressively to the destruction of the thrust plungers 6.

Figure 5:
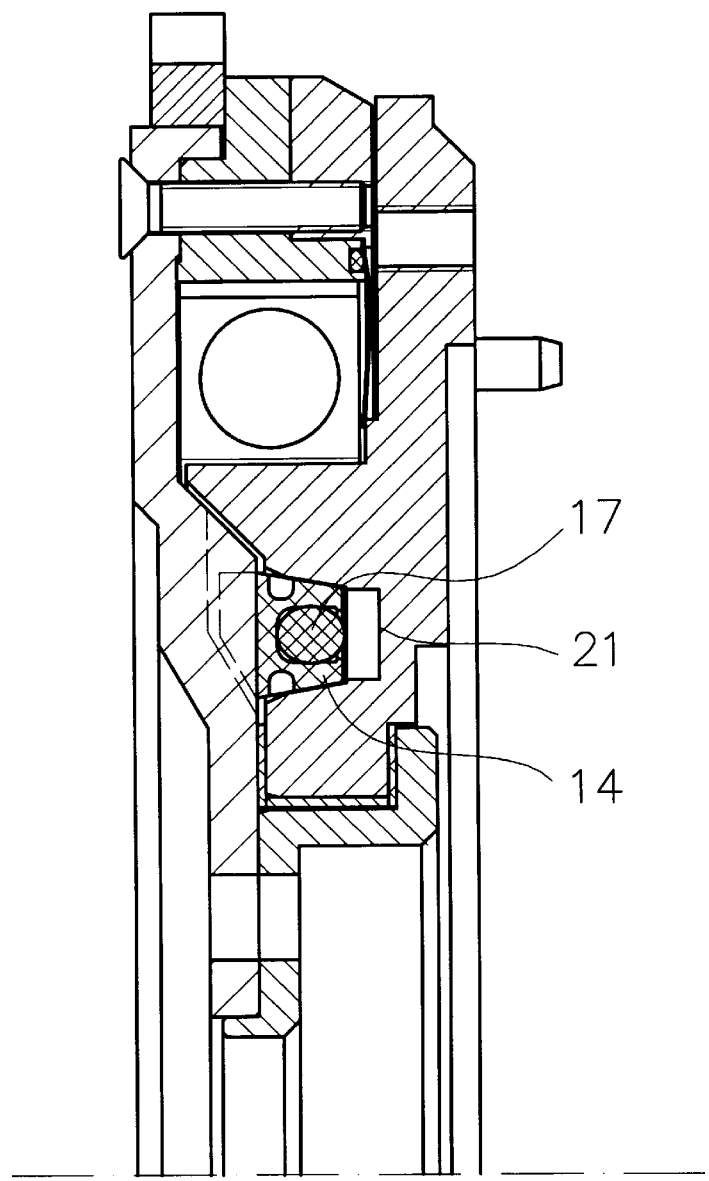
FIG. 5 is a fragmentary axial sectional view of another embodiment of a torsional vibration damper according to the present invention, showing in detail a second variation of a drag friction ring according to the present invention provided with a rubber O-ring.

In order to prevent this from happening, the torsion vibration damper according to the present invention provides a drag friction ring 14 made of plastic material and exhibiting an open hollow section shown in FIG. 1 of U-shaped configuration or circular slot 15. Received in the slot 15 is a coiled metallic spring 16, as shown in the embodiment of FIG. 1, or a rubber O-ring 17, as shown in the embodiment of FIG. 5. The purpose of this springy element 16 or 17 is to apply a defined spreading force on the flanks 18 of the drag friction ring 14.

On the side 19 opposite the open side of the circular slot 15, the drag friction ring 14 has drive cams 20 distributed over the circumference. The drag friction ring 14 is inserted without clearance with the open side of the circular slot 15 into an annular slot 21 of substantially conical configuration in axial direction. The conical slot 21 is formed in the driven disk 2 and tapers in the direction towards the opening of the circular slot 15 provided in the drag friction ring 14.

Figure 3:
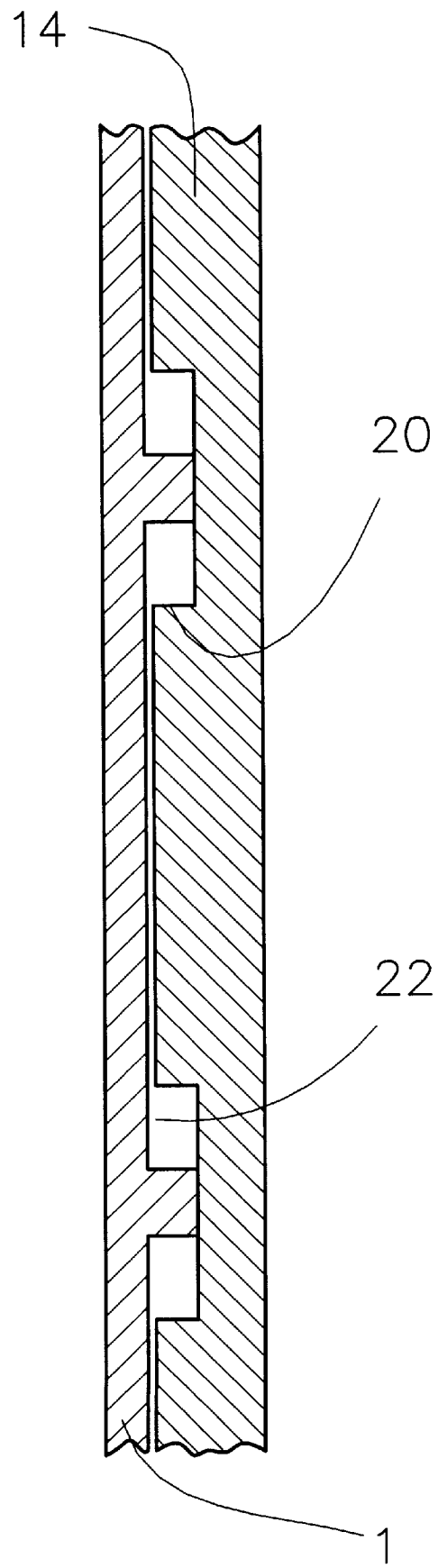
FIG. 3 is a developed view of the drag friction ring and a primary part of the torsional vibration damper of FIG. 1.

As shown in FIG. 3, the drive cams 20 of the drag friction ring 14 engage in indentations 22 of the drive disk 1 with circumferential clearance. This clearance makes it possible that the above described spring and damping system comprised of tangential compression springs 7 and thrust plungers 6 is able to work freely with low amplitudes. Only a minor residual friction moment remains which is caused by the contact force between the primary part 1 and the drag friction ring 14.

Only with increasing amplitudes will the drive cams 20 contact one or the other side of the indentations 22 in the drive disk 1 causing the drag friction ring 14 to rotate in the slot 21 while producing friction work. In this new position, provided that only minor amplitudes occur thereafter, the above described spring and damping system is able to resume operation.

Figure 4:
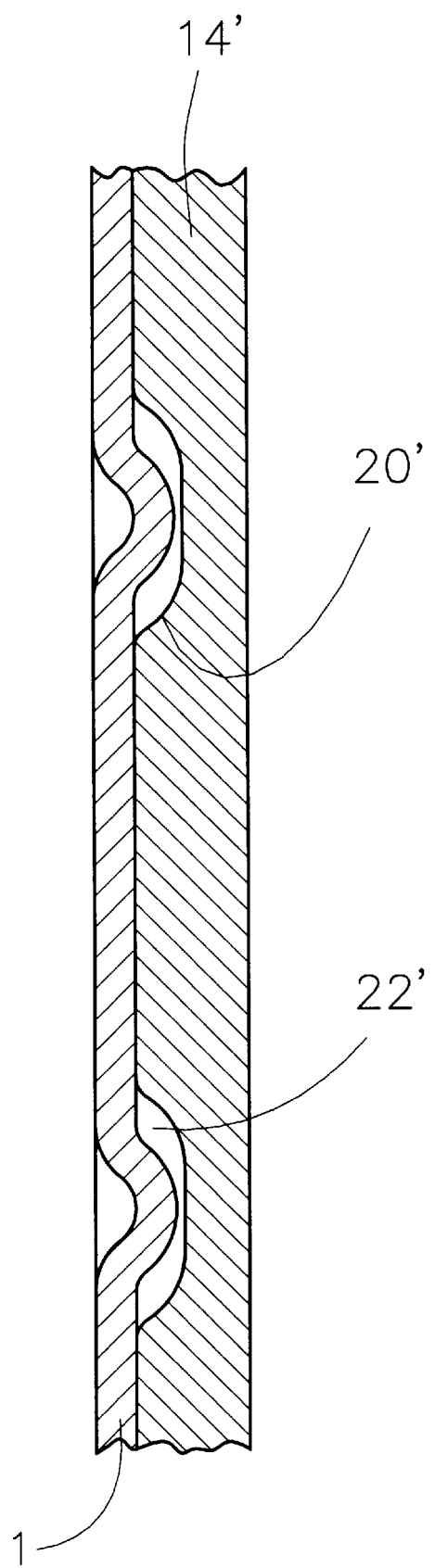
FIG. 4 is a developed view of an alternative drag friction ring and the primary part of a torsional vibration damper according to the present invention.

A variation is shown in FIG. 4, with the drive cams 20' and the indentations 22' in the drag ring 14' rounded at the edges. This rounding, which can also be designed as ramp or curved line, serves to force the primary part 1 and the drag friction ring 14' axially apart in the area of contact in order to increase the friction created.

Figure 6:
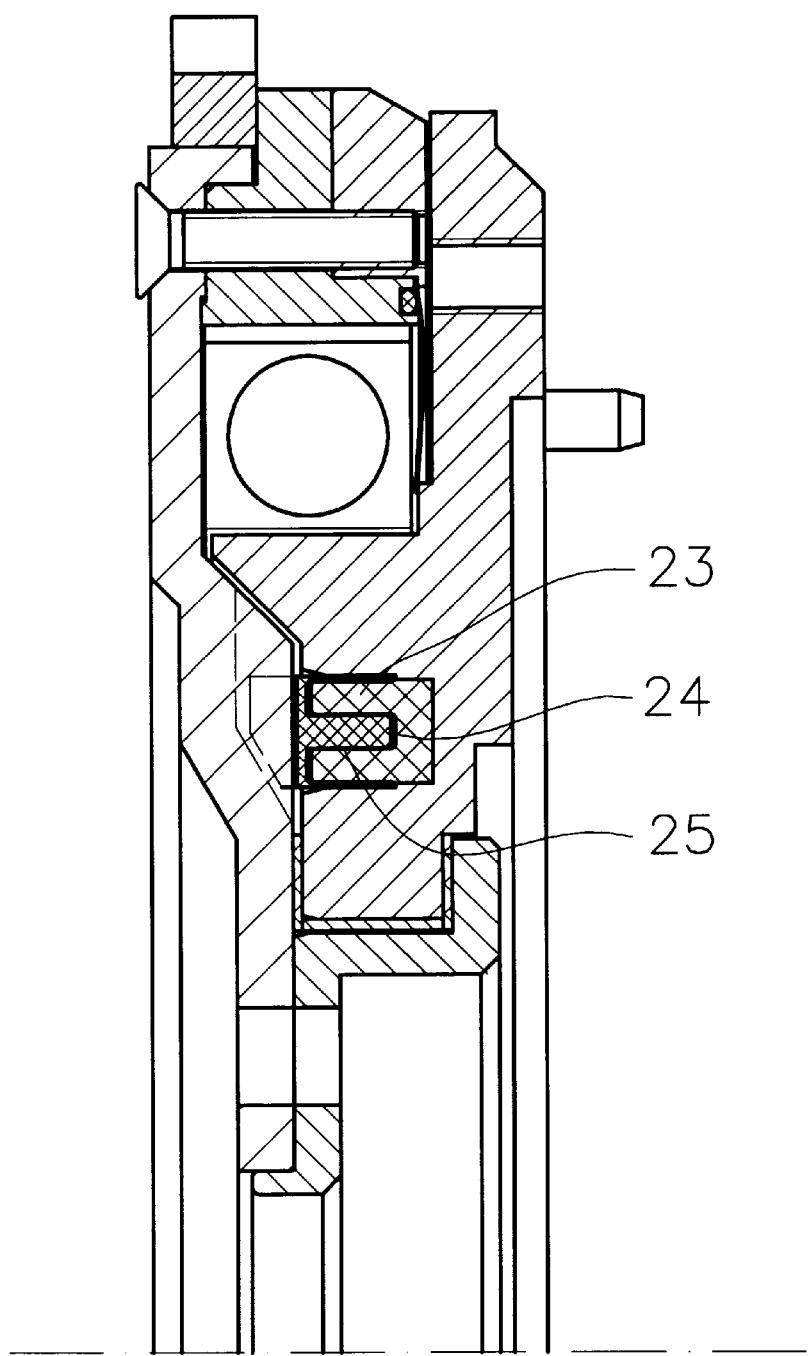
FIG. 6 is a fragmentary axial sectional view of still another embodiment of a torsional vibration damper according to the present invention, showing in detail a third variation of a drag friction ring according to the present invention provided with grease charge.

FIGS. 5 and 6 show further embodiments of the drag friction ring, with FIG. 5 depicting a rubber O-ring 17 for adjusting the torque required for rotating the drag ring 14 in the slot 21, and with FIG. 6 showing a two-part drag friction ring 23, 24 having a grease charge 25 provided between the first part 23 and the second part 24. Relative movements of the parts 23 and 24 of the drag friction ring 23, 24 against one another does not create Coulomb friction in the grease charge 25 but a speed-proportional shearing friction.

Figure 7:
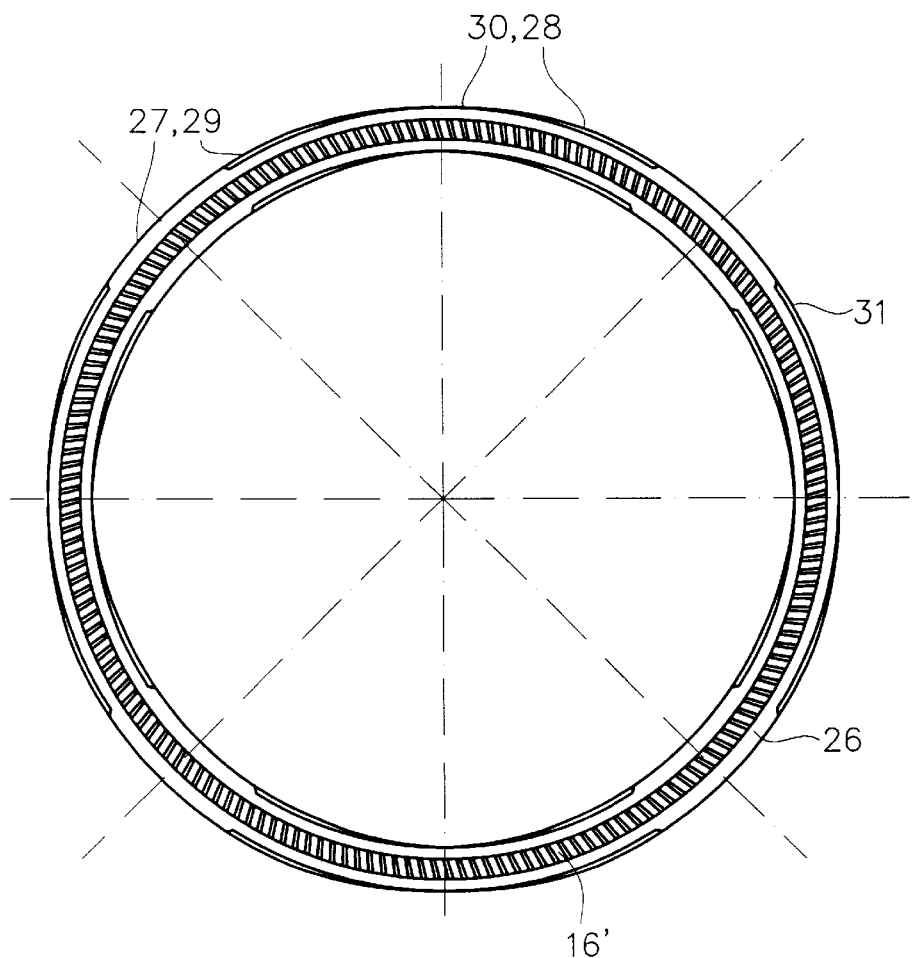
FIG. 7 is a bottom view of a fourth variation of a drag friction ring according to the invention with angle-dependent friction increase acting in radial direction.

FIG. 7 shows a further embodiment of a drag friction ring 26, in this case with a coiled metallic spring 16'. The drag friction ring 26 does not have identical inner and outer diameters about the circumference but several relatively wide sections 27 and several relatively narrow sections 28. These sections 27, 28 interact with complementary recessed sections 29, 30 in a slot 31 of the driven disk 2. Thus, the applied friction moment is angle-dependent. When the wide section 27 of the drag friction ring 26 moves into the narrow section 30 of the slot 31, the friction moment increases. This can be advantageous for certain applications.

Figure 8:
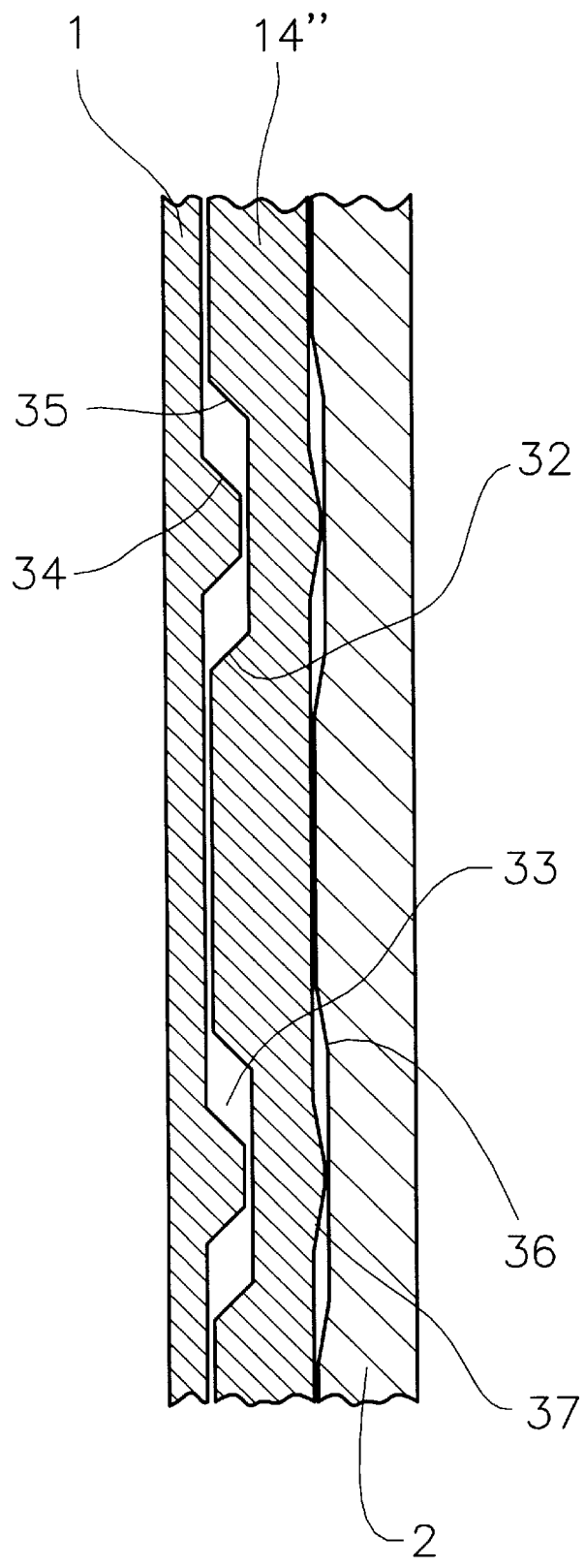
FIG. 8 is a developed view of the drag friction ring, a primary part and a secondary part with angle-dependent friction increase acting in axial direction.

FIG. 8 shows a developed view of a drag friction ring 14" in conjunction with the drive disk 1 and the driven disk 2, with the drive cams 32 of the drag friction ring 14" and the indentations 33 in the drive disk 1 being designed as ramps 34, 35 in axial direction. At respectively great torque and resultant angle of rotation, the drag friction ring 14" is pressed against the driven disk 2 in axial direction, whereby the driven disk 2 is formed at the contact surface with ramps 36, 37 which generate an angle-dependent Coulomb friction.

FIGS. 9 and 9a show a further embodiment of a drag friction ring 14''', with the springy element of this drag friction ring 14''' being formed by a sheet metal ring 38 which is spread apart by a compression spring 39. The sheet metal ring 38 and the compression spring 39 are positioned in an inner slot of a plastic ring 40 which acts as drag friction ring.

FIG. 10 described the operation of the torsional vibration damper with drag friction ring according to the invention by means of a characteristic superimposition. The diagram A shows the natural angular torque characteristic of a conventional spring and damping system. Diagram B shows a corresponding characteristic of the drag friction ring where small friction moments occur within the free angle 41 and relatively high moments in the area of drive 42, 43.

The areas enclosed by the respective loops 44, 45, 46 correspond to the damping energies which are extracted from the system when passing through large angular amplitudes. Diagram C is a superimposition of the effects according to diagram A and diagram B and shows a clearly increased damping action compared with diagram A While the invention has been illustrated and described as embodied in a mechanical torsional vibration damper, it is not intended to be limited to the details shown since various modifications and structural changes may be made without departing in any way from the spirit of the present invention.

What is claimed as new and desired to be protected by Letters Patent is set forth in the appended claims:

1. A mechanical torsional vibration damper, comprising a primary part; a secondary part; a spring and damping system for connecting the primary part and the secondary parts, said spring and damping system including tangential compression springs and thrust plungers acting on contact surfaces on the primary part and the secondary part; and an additional damping unit provided between the primary part and the secondary part.

2. The mechanical torsional vibration damper of claim 1 wherein the additional damping unit acts radially.

3. The mechanical torsional vibration damper of claim 1 wherein the additional damping unit has an annular configuration.

4. The mechanical torsional vibration damper of claim 1 wherein one of the components selected from the group consisting of primary part and secondary part has a slot and the other one of the components selected from the group consisting of primary part and secondary part has indentations, said damping unit including a drag friction ring received in the slot and formed at the side opposite the slot with drive cams which engage with clearance in the indentations provided on the other component.

5. The mechanical torsional vibration damper of claim 4 wherein the drag friction ring is received in the slot without play.

6. The mechanical torsional vibration damper of claim 4 wherein the drag friction ring has an open hollow section which is in the shape of a shaft oil seal and receives an element selected from the group consisting of coiled metallic spring and rubber O-ring.

7. The mechanical torsional vibration damper of claim 4 wherein the drag friction ring and the slot for receiving the drag friction ring exhibit an uneven width in circumferential direction.

8. The mechanical torsional vibration damper of claim 4 wherein the drag friction ring is formed by at least two interconnected parts having a grease charge therebetween.

9. The mechanical torsional vibration damper of claim 4 wherein the damping unit has a tension ring interrupted in circumferential direction.

10. The mechanical torsional vibration damper of claim 4 wherein the drive cams of the drag friction ring and the indentations of the other component have run-up surfaces, ramps or curved surfaces.

11. The mechanical torsional vibration damper of claim 4 wherein contact surfaces of the drag friction ring and contact surfaces of the secondary part have run-up surfaces ramps or curved surfaces.

12. The mechanical torsional vibration damper of claim 4 wherein the slot accommodating the drag friction ring is of conical configuration in axial direction.

13. The mechanical torsional vibration damper of claim 4 wherein the drag friction ring is made of plastic material.

* * * * *